(12) United States Patent
Höchsmann

(10) Patent No.: US 8,020,604 B2
(45) Date of Patent: Sep. 20, 2011

(54) METHOD FOR THE LAYERED CONSTRUCTION OF MODELS

(76) Inventor: Rainer Höchsmann, Genderkingen (DE)

( * ) Notice: Subject to any disclaimer, the term of this patent is extended or adjusted under 35 U.S.C. 154(b) by 778 days.

(21) Appl. No.: 10/559,920

(22) PCT Filed: Jun. 14, 2004

(86) PCT No.: PCT/DE2004/001223
§ 371 (c)(1),
(2), (4) Date: Apr. 20, 2006

(87) PCT Pub. No.: WO2004/112988
PCT Pub. Date: Dec. 29, 2004

(65) Prior Publication Data
US 2006/0237159 A1    Oct. 26, 2006

(30) Foreign Application Priority Data

Jun. 17, 2003    (DE) ................. 103 27 272

(51) Int. Cl.
*B22C 9/02*     (2006.01)
*B22C 1/16*     (2006.01)
(52) U.S. Cl. ................ 164/456; 164/23; 164/525
(58) Field of Classification Search ............ 164/525, 164/23, 4.1, 456
See application file for complete search history.

(56) References Cited

U.S. PATENT DOCUMENTS

| | | |
|---|---|---|
| 4,239,715 A | 12/1980 | Pratt |
| 4,247,508 A | 1/1981 | Householder |
| 4,279,949 A | 7/1981 | Esser et al. |
| 4,369,025 A | 1/1983 | Von Der Weid |
| 4,575,330 A | 3/1986 | Hull |
| 4,752,352 A | 6/1988 | Feygin |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,076,869 A | 12/1991 | Bourell et al. |
| 5,127,037 A | 6/1992 | Bynum |
| 5,132,143 A | 7/1992 | Deckard |
| 5,147,587 A | 9/1992 | Marcus et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,221,539 A | 6/1993 | Pallerberg et al. |
| 5,248,456 A | 9/1993 | Evans et al. |
| 5,252,264 A | 10/1993 | Forderhase et al. |
| 5,284,695 A | 2/1994 | Barlow et al. |
| 5,296,062 A | 3/1994 | Bourell et al. |
| 5,316,580 A | 5/1994 | Deckard |
| 5,340,656 A | 8/1994 | Sachs et al. |
| 5,342,919 A | 8/1994 | Dickens, Jr. et al. |
| 5,352,405 A | 10/1994 | Beaman et al. |
| 5,382,308 A | 1/1995 | Bourell et al. |
| 5,387,380 A | 2/1995 | Cima et al. |
| 5,431,967 A | 7/1995 | Manthiram et al. |
| 5,482,659 A | 1/1996 | Sauerhoefer |
| 5,490,962 A | 2/1996 | Cima et al. |
| 5,518,680 A | 5/1996 | Cima et al. |
| 5,573,055 A * | 11/1996 | Melling et al. .................. 164/15 |
| 5,597,589 A | 1/1997 | Deckard |
| 5,601,868 A | 2/1997 | Gerhardt |
| 5,616,294 A | 4/1997 | Deckard |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,730,925 A | 3/1998 | Wilkening et al. |
| 5,753,274 A | 5/1998 | Wilkening et al. |
| 5,807,437 A | 9/1998 | Sachs et al. |
| 5,851,465 A | 12/1998 | Bredt |
| 5,902,441 A | 5/1999 | Bredt et al. |
| 5,902,537 A | 5/1999 | Almquist et al. |
| 5,934,343 A | 8/1999 | Gaylo et al. |
| 5,943,235 A | 8/1999 | Earl et al. |
| 5,965,170 A | 10/1999 | Matsuoka et al. |
| 6,007,318 A | 12/1999 | Russell et al. |
| 6,036,777 A * | 3/2000 | Sachs .............................. 118/56 |
| 6,042,774 A | 3/2000 | Wilkening et al. |
| 6,048,188 A | 4/2000 | Hull et al. |
| 6,116,517 A | 9/2000 | Heinz et al. |

(Continued)

FOREIGN PATENT DOCUMENTS

DE    4300478 C1    8/1994

(Continued)

OTHER PUBLICATIONS

Cima et al., "Computer-derived Microstructures by 3D Printing: Bio- and Structural Materials," SFF Symposium, Austin, TX, 1994.

(Continued)

*Primary Examiner* — Kevin P Kerns
(74) *Attorney, Agent, or Firm* — Dobrusin & Thennisch PC

(57) ABSTRACT

A method for the layered construction of models is disclosed, whereby at least one first material is applied to a building platform and then a second material is selectively applied in layers. Both application steps are then repeated until the desired model is obtained and the both materials form a solid body with a desired mixing ratio. The first material comprises a moulding sand and the first and/or the second material comprises a binder, comprising a crystalline salt binder, or/and a protein binder.

20 Claims, No Drawings

U.S. PATENT DOCUMENTS

| | | | |
|---|---|---|---|
| 6,146,567 | A | 11/2000 | Sachs et al. |
| 6,147,138 | A | 11/2000 | Hochsmann et al. |
| 6,155,331 | A | 12/2000 | Langer et al. |
| 6,193,922 | B1 | 2/2001 | Ederer |
| 6,217,816 | B1 | 4/2001 | Tang |
| 6,258,170 | B1 | 7/2001 | Smoekh et al. |
| 6,316,060 | B1 | 11/2001 | Elvidge et al. |
| 6,322,728 | B1 | 11/2001 | Brodkin et al. |
| 6,375,874 | B1 | 4/2002 | Russell et al. |
| 6,401,001 | B1 | 6/2002 | Jang et al. |
| 6,403,002 | B1 | 6/2002 | van der Geest |
| 6,416,850 | B1 | 7/2002 | Bredt et al. |
| 6,423,255 | B1 | 7/2002 | Hoechsmann et al. |
| 6,436,334 | B1 * | 8/2002 | Hattori et al. ............ 264/669 |
| 6,460,979 | B1 | 10/2002 | Heinzl et al. |
| 6,467,525 | B2 * | 10/2002 | Herreid et al. ............ 164/12 |
| 6,500,378 | B1 | 12/2002 | Smith |
| 6,554,600 | B1 | 4/2003 | Hofmann et al. |
| 6,610,429 | B2 | 8/2003 | Bredt et al. |
| 6,733,528 | B2 | 5/2004 | Abe et al. |
| 6,830,643 | B1 | 12/2004 | Hayes |
| 6,838,035 | B1 | 1/2005 | Ederer et al. |
| 7,004,222 | B2 | 2/2006 | Ederer et al. |
| 7,204,684 | B2 | 4/2007 | Ederer et al. |
| 2002/0026982 | A1 | 3/2002 | Bredt et al. |
| 2004/0025905 | A1 | 2/2004 | Ederer et al. |
| 2004/0026418 | A1 | 2/2004 | Ederer et al. |
| 2004/0035542 | A1 | 2/2004 | Ederer et al. |
| 2004/0056378 | A1 | 3/2004 | Bredt et al. |
| 2004/0094058 | A1 | 5/2004 | Kasperchik et al. |
| 2004/0170765 | A1 | 9/2004 | Ederer et al. |
| 2005/0167872 | A1 | 8/2005 | Tsubaki et al. |
| 2006/0105102 | A1 | 5/2006 | Hochsmann et al. |
| 2006/0175346 | A1 | 8/2006 | Ederer et al. |

FOREIGN PATENT DOCUMENTS

| | | |
|---|---|---|
| DE | 4325573 | 2/1995 |
| DE | 29506204.5 | 4/1995 |
| DE | 4400523 | 7/1995 |
| DE | 4440397 | 9/1995 |
| DE | 29701279 | 1/1997 |
| DE | 19511772 C2 | 9/1997 |
| DE | 19723892 | 9/1998 |
| DE | 19846478 | 4/2000 |
| DE | 19853834 | 5/2000 |
| DE | 10047614 | 4/2002 |
| DE | 10117875 | 1/2003 |
| DE | 10216013 A1 | 10/2003 |
| EP | 0711213 B1 | 5/1995 |
| EP | 0361847 | 11/1995 |
| EP | 0431924 | 1/1996 |
| EP | 0739666 | 10/1996 |
| EP | 0688262 | 6/1999 |
| EP | 0734842 | 8/1999 |
| EP | 1163999 A2 | 5/2001 |
| EP | 0968 776 | 10/2002 |
| FR | 2790418 | 9/2000 |
| WO | WO 95/18715 | 7/1995 |
| WO | WO 96/05038 | 2/1996 |
| WO | WO 00/03324 | 1/2000 |
| WO | WO 00/21736 | 4/2000 |
| WO | WO 01/26885 | 4/2001 |
| WO | WO 01/72502 A1 | 4/2001 |
| WO | WO 01/34371 | 5/2001 |
| WO | WO 02/26419 | 4/2002 |
| WO | WO 02/26420 | 4/2002 |
| WO | WO 02/26478 | 4/2002 |
| WO | WO 02/28568 | 4/2002 |
| WO | WO 02/064353 | 8/2002 |
| WO | WO 02/064354 | 8/2002 |
| WO | WO 02/083323 | 10/2002 |
| WO | WO 03/016030 | 2/2003 |
| WO | WO 03/086726 | 10/2003 |
| WO | WO 03/097518 | 11/2003 |
| WO | WO 03/103932 A1 | 12/2003 |
| WO | WO 2004/112988 | 12/2004 |
| WO | WO 2005/080010 | 9/2005 |
| WO | WO 2005/113219 | 12/2005 |

OTHER PUBLICATIONS

Copending National Phase Application, WO 02/26419, Apr. 4, 2002.
Copending National Phase Application, WO 02/26420, Apr. 4, 2002.
Copending National Phase Application, WO 02/26478, Apr. 4, 2002.
Copending National Phase Application, WO 02/28568, Apr. 11, 2002.
Copending National Phase Application, WO 02/083323, Oct. 24, 2002.
Copending National Phase Application, WO 03/086726, Oct. 17, 2005.
Copending National Phase Application, WO 03/103932, Dec. 18, 2003.
Copending National Phase Application, WO 03/097518, Jun. 24, 2005.
EOS Operating Manual for Laser Sintering Machine with Brief Summary.
Gephart, Rapid Prototyping, pp. 118-119, 1996.
International Search Report, PCT/DE00/03324, Jun. 5, 2001.
International Search Report, PCT/DE01/03661, Feb. 28, 2002.
International Search Report, PCT/DE01/03662, Mar. 1, 2002.
International Search Report, PCT/DE02/01103, Sep. 30, 2002.
International Search Report, WO 04/110719, Jan. 11, 2005.
Marcus et al., Solid Freedom Fabrication Proceedings, Nov. 1993.
Opposition of Patent No. DE10047614, Jun. 25, 2003.
Opposition to European Patent No. 1322458 B1, Jan. 19, 2005.
Sachs et al., "Three-Dimensional Printing: Rapid Tooling and Prototypes Directly from a CAD Model", Massachusetts Institute of Technology, pp. 143-151.
Sachs et al., "Three-Dimensional Printing: Rapid Tooling and Prototypes Directly from a CAD Model", Massachusetts Institute of Technology, pp. 131-136.
Williams, "Feasibility Study of Investment Casting Pattern Design by Means of Three Dimensional Printing", Department of Machanical Enginerring, pp. 2-15, Jun. 5, 1989.
Copending National Phase Application, WO 05/080010, Sep. 1, 2005.
Copending National Phase Application, WO 05/113219, Dec. 1, 2005.
Jacobs et al., 2005 SME Technical Paper, title "Are QuickCast Patterns Suitable for Limited Production?", 2005.
Feature Article—Rapid Tooling—Cast Resin and Sprayed Metal Tooling by Joel Segal, Apr. 2000.
Marcus, et al., Solid Freeform Fabrication Proceedings, Sep. 1995, p. 130-133.
US 4,937,420, 06/1990, Deckard (withdrawn)

* cited by examiner

METHOD FOR THE LAYERED CONSTRUCTION OF MODELS

This invention involves a procedure for layered composition of models.

State-of-the-art examples of this procedure include rapid-prototyping manufacture of moulds and casting models without a use of tools.

For instance, DE 198 53 834 A1 describes a rapid-prototyping procedure for creating cast models. In this case, an untreated particle material like quartz sand is applied in a thin layer to an assembly platform. After that, a spraying mechanism is used to finely distribute a bonding agent over the entire particle material. Selected areas of the resulting surface are subsequently covered with hardener to reinforce the particle material wherever required. Repeating this whole process several times permits a structure to be shaped individually from the bonded particle material. This structure is initially embedded in the encompassing, unbound particle material and can be removed later following completion of the assembly process.

For example, if this type of rapid-prototyping procedure makes use of quartz sand as the particle material and furan resin as the bonding agent, sulphuric acid as the hardener makes it possible to create a mould consisting of materials normally employed during mould production and therefore familiar to experts.

The binder largely consists of furfuryl alcohol, nitrogen, water and free formaldehyde. Concentrated sulphuric acid is normally used as the activator.

A major disadvantage of moulds so manufactured are the environmentally harmful constituents of the binder material. This results in complex handling and recycling of such material, especially during actual mould manufacture, casting, de-moulding and disposal of the casting sand.

During casting, the organic binders are decomposed into gaseous substances. This gas formation can negatively affect the cast component by allowing gases to permeate the metal and make the workpiece porous. This can notably worsen component quality.

In the case of such modelling, however, it is important for the binder to decompose into organic substances in order to permit subsequent coring of the cast metal part.

Furthermore, the crack products arising during decomposition of the binder are environmentally harmful and need to be disposed of appropriately.

Demoulding of the cast part can require a great deal of energy, because the binder needs to be destroyed thermally before it can be removed from the cast part's cavities.

The sand employed as the particle material must be reconditioned thermally after casting, i.e. residual bonding agent must be combusted through intense heating of the sand. This, too, requires a lot of energy and also gives rise to environmentally harmful reaction products. Alternatively, the sand can be deposited on landfills, although this measure is not very environmentally compatible either.

In general, however, organic binders can be integrated very favourably into layering techniques. A multi-component resin is usually employed for this purpose. In addition to the afore-mentioned option of selectively applying two components in succession to the untreated sand, it is also possible to mix a reaction component into the sand and selectively dose a second component. Either this proves sufficient for a subsequent, selective combination of the sand particles, or additional use is required of thermal energy or a reactive gas during/after the assembly process.

U.S. Pat. No. 5,204,055 proposes manufacture of metal moulds via 3-D pressing. Here, the basic material comprises aluminium oxide ceramic particles, the bonding agent a colloidal silica suspension. Due to poor coring properties, however, this material system is unsuitable for sand casting, and exhibits notable discrepancies with respect to the usual sand casting characteristics.

Moulds so produced possess a certain green strength after assembly. To achieve their final strength, the moulds must undergo thermal transfer. In this process, cracks can occur in the moulds, or the component dimensions can change as a result of contraction.

In such cases, demoulding of the cores is performed in a special solution or by means of a water jet.

As experts will know, Z-Corp. uses a gypsum-based system for manufacturing moulds. One disadvantage of this type of material is the divergence of its casting properties from those of sand casting; there are no similarities here.

The invention under consideration is accordingly intended to provide a procedure for layered composition of models—i.e. moulds and cores—making use of environmentally friendly bonding agents fulfilling specified criteria for moulded material such as strength and stability. Moreover, the casting properties are to be similar to those of conventional sand casting.

This is accomplished by a procedure for layered composition of models, whereby at least a first material is applied to an assembly platform, followed by selective application of a second material layer; these two application steps are repeated until the required model is achieved and both materials form a solid structure in an appropriate mixture ratio. The first material comprises a moulding sand; the first and/or second material comprises a bonding agent encompassing a salt-crystal binder and/or protein binder.

Salt-crystal or protein bonding agent used in a procedure for layered composition of models is characterized, in particular, by its environmental compatibility during production, mould handling, casting and disposal.

Furthermore, this type of procedure in conjunction with moulding materials commonly used in foundries makes it possible to achieve models with very good material characteristics highly similar to those associated with sand casting.

After casting, the resultant component can be demoulded very easily through immersion in water or shaking. This is permitted by the high water solubility of salt-crystal binder.

In a preferred embodiment of the procedure forming part of this invention, the bonding agent is mixed into the first material.

The first material in the procedure forming part of this invention is expediently a mixture comprising bonding agent and moulding sand.

This makes it possible to add a type of salt to the sand. Water is then added selectively to the resultant mixture. The salt dissolves in the water to encompass the sand. After the sand has dried, the salt crystallizes to bind the sand particles.

This material's behaviour during casting is absolutely neutral. The salt's melting temperature is notably higher than that of the metal, thus preventing a generation of gases during casting. However, the moulded material needs to dry optimally to prevent boiling retardation. For this purpose, conventional core-shooting techniques make use of microwave radiation to dry the core. This would also be possible for the procedure forming part of this invention. The model can furthermore be purged with warm air.

After casting, the mould can be cored through immersion in water, which dissolves the salt and related bond.

The sand can be re-used after casting. Yet another advantageous casting property here is the neutral odour compared with organic bonding agents.

In the procedure forming part of this invention, it is also possible for the moulding sand to be coated with the bonding agent.

In a preferred embodiment of the procedure forming part of this invention, the bonding agent is mixed into the second material.

Good results are achieved if the first material comprises moulding sand, the second material a solvent.

If the solvent essentially comprises water, it is fully compatible with the environment and very economical.

It is preferable for the second material to be applied by means of droplet generation.

In addition, it is possible for the second material to be applied by means of screen printing or spraying through a template.

In the procedure forming part of this invention, it is especially preferable for the solvent to be removed through drying after an appropriate reaction time has elapsed.

In the procedure forming part of this invention, the moulding sand preferably comprises quartz sand, zircon sand, olivine sand and/or fireclay sand.

The bonding agent in the procedure forming part of this invention is based preferably on magnesium sulphate, sodium polyphosphate and/or protein.

The described procedure forming part of this invention has proven particularly suitable for manufacturing components serving as moulds for metal casting.

Examples of preferred embodiments below are used to describe the invention more closely.

A procedure for layered composition of foundry moulds according to this invention is described in the following.

In contemporary procedures, binder is mixed with basic mould material—usually comprising quartz sand—and applied in thin layers using a coater to defined areas of a lowerable assembly platform. A computer-controlled pressure head applies activator to the porous sand layer over the required cross-sectional areas of the component to be generated. The final component is achieved successively by repeating this entire process, i.e. lowering the assembly platform by one layer thickness unit, applying a thin layer of sand and binder, and selectively dosing activator.

According to the invention, the bonding agent comprises a salt or protein binder.

The binder can either be pre-mixed with the sand prior to layering, or added as particle material to the sand. Moreover, it is possible to selectively apply the binder in a solution and/or dilution by means of a dosage head in accordance with the cross-sectional profile which needs to be achieved.

The bonding agent can be employed in a variety of ways as part of the layering process. For example, it can be mixed in the form of solid particles with the sand. The resultant mixture is then applied in layers to an assembly field. After that, water or a solvent is applied by means of a droplet generator (alternatively: screen printing, spray through a template) to the required cross-sectional areas of the component. After a short reaction time, the water is removed through drying (passive drying, microwave radiation, heat radiation, warm air stream etc.). The entire process is repeated by lowering the assembly platform and applying a new layer.

It is also possible to remove the water from the bond after completion of the entire assembly process, although this poses a danger of diffusion which can disperse the component's geometry.

Another option is to coat the sand with the binder prior to the process and employ it as described above.

Yet another possibility is to apply a mixture of binder and water to untreated sand.

In all procedural variants, the resultant model is freed of surrounding material after the assembly process, and the sand made available for recycling.

It is important to dose the solvent in the exactly required quantities. On one hand, sufficient solvent should be dosed to bind the particles mutually and with the underlying layer. On the other hand, the solvent dosage should be kept within certain limits to prevent undesired diffusion and resulting impairment to the model's outline and accuracy.

Particularly good results are achieved if the first material comprises a moulding sand like quartz sand and 1.8% by weight of LaempeKuhsBinder® (a binder made by Laempe). The second material dosed in the preferred embodiment exemplified at the start comprises 3% by weight of water.

GMBond protein binder from Hormel is particularly suitable for the foundry applications associated with the procedure forming part of this invention.

Quartz sand is highly suitable as a basic material also when mixed with protein binder.

The invention claimed is:

1. A procedure for layered composition of a metal casting mould, comprising the steps of:
   a) mixing solid particles of a bonding agent comprising a salt-crystal or a salt-crystal and protein combination, with a sand that comprises quartz sand, zircon sand, olivine sand, fireclay sand, or a combination thereof, to form a bonding agent/sand admixture;
   b) applying a thin layer of the bonding agent/sand admixture to an assembly field of an assembly platform;
   c) selectively applying an aqueous solvent via a droplet generator to a cross-sectional area of the metal casting mould being generated, in a sufficient dose so that the sand is bound by the salt-crystal or the salt-crystal and protein combination without impairing the outline and accuracy of the metal casting mould on the assembly field of the assembly platform;
   d) dissolving with the aqueous solvent the salt-crystal or salt-crystal and protein combination with the aqueous solvent, so that the salt-crystal or salt-crystal and protein combination substantially encompasses the sand particles within a layer and any underlying sand particles that may be present;
   e) removing through drying the aqueous solvent so that the bonding agent/sand admixture bind together;
   f) lowering the assembly platform;
   g) repeating at least steps (a)-(f) for applying an additional layer until the metal casting mould is complete;
   h) casting a metal casting from the resulting metal casting mould;
   i) coring the metal casting through immersion in a water bath after the metal casting has been cast;
   j) dissolving the bonding agent/sand admixture in the water bath; and
   k) recycling the sand from the water bath.

2. The procedure according to claim 1, wherein the solvent is removed by applying microwave radiation heating or warm air.

3. The procedure according to claim 1, whereby the bonding agent comprises at least magnesium sulphate or sodium polyphosphate.

4. The procedure according to claim 1, wherein the salt-crystal or the salt-crystal and protein combination comprises 3 percent by weight water before the salt-crystal or the salt-crystal and protein combination is applied to the assembly platform.

5. The procedure according to claim 1, wherein the step of removing begins after a sufficient amount of reaction time has elapsed.

6. The procedure according to claim 1, wherein the casting mould is sufficiently dried so that boiling retardation is prevented.

7. The procedure according to claim 5, wherein the casting mould is sufficiently dried so that boiling retardation is prevented.

8. A method for producing a model comprising:
   a) mixing solid particles of a bonding agent comprising a salt-crystal, a protein, or both, with particles of sand the particles of sand including: quartz sand, zircon sand, olivine sand, fireclay sand, or a combination thereof, to form a bonding agent/sand solid particle admixture;
   b) applying a thin layer of the bonding agent/sand solid particle admixture to an assembly field of an assembly platform;
   c) selectively applying a solvent to a cross-sectional area of the thin layer of the bonding agent/sand solid particle admixture, to underlying sand particles that may be present, to the bonding agent/sand admixture in required areas for reacting the solvent with the bonding agent/sand admixture, or a combination thereof, in a sufficient dose so that the particles of sand within the thin layer are bonded to each other by the salt crystal, the protein, or both without impairing the outline and accuracy of the metal casting mould on the assembly field of the assembly platform;
   d) drying the particles of sand so that the solvent is removed;
   e) lowering the assembly platform; and
   f) repeating at least steps (a)-(e) for applying an additional layer until the model is complete.

9. The procedure of claim 8, further including a step of recycling the sand from the resulting mould.

10. The method of claim 8, wherein the solvent dissolves the bonding agent so that the particles of sand are coated with the bonding agent.

11. The method of claim 8, wherein the solvent essentially comprises water.

12. The method of claim 11, wherein the solvent is applied by a droplet generator.

13. The method of claim 11, wherein the solvent is applied by screen printing or spraying through a template.

14. The method of claim 8, wherein the solvent is removed by drying after an appropriate reaction time has elapsed.

15. The method of claim 8, whereby the bonding agent comprises magnesium sulphate or sodium polyphosphate.

16. The method of claim 8, whereby the model is a metal casting mould.

17. The procedure according to claim 8, wherein the step of drying begins after a sufficient amount of reaction time has elapsed.

18. The procedure according to claim 8, wherein the casting mould is sufficiently dried so that boiling retardation is prevented.

19. The procedure according to claim 17, wherein the casting mould is sufficiently dried so that boiling retardation is prevented.

20. The procedure according to claim 8, wherein the bonding agent comprises 3 percent by weight water before the bonding agent is applied to the assembly platform.

* * * * *